United States Patent Office 3,096,368
Patented July 2, 1963

3,096,368
PROCESS FOR PREPARING HYDROLYSIS PRODUCTS OF γ-DIMETHYL AMINO-β-HYDROXYBUTYRONITRILE CHLOROMETHYLATE
Fernand Aime Ghislain Binon, Brussels, Belgium, and Georges J. L. Dechamps, deceased, late of Brussels, Belgium, by Elsa Dechamps, representative, Brussels, Belgium, assignors, by mesne assignments, to Societe Belge de L'Azote et des Produits Chimiques du Marly, Liege, Belgium
No Drawing. Filed July 30, 1958, Ser. No. 791,233
Claims priority, application Belgium May 8, 1953
(Filed under Rule 47(a) and 35 U.S.C. 116)
11 Claims. (Cl. 260—534)

This invention relates to a process for the practical or commercial production of the hydrolysis products of γ-dimethylamino-β-hydroxybutyronitrile chloromethylate including the chloride of γ-trimethylamino-β-hydroxybutyric acid, otherwise known as carnitine, having the formula:

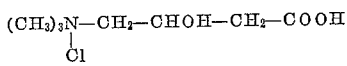

As recent experimental research has revealed the existence and nature of a biological action of carnitine on the animal and human organism, the production of this substance by means other than those involving the processing of meat juice, whey or any other natural source of carnitine offers considerable industrial advantage.

To date, however, it has proved impossible to produce pure carnitine, in the crystallized state, easily or in substantial quantities either from natural sources or by synthesis. The only method of extraction known at present consists in precipitating the carnitine as a chloro-aurate, Reineckate or mercuric complex from fractions taken from muscle extract, meat extract, whey or other natural sources. Not only do these methods involve long and laborious, and consequently costly, operations of extraction, purification and regeneration, but as the precipitation agents used are not selective, it is very difficult to produce by these means pure carnitine in any appreciable quantity.

The processes so far known of preparing carnitine synthetically may be summarized and commented upon as follows:

In 1910, Engeland (Ber. (1910) 43, 2705) reported that when γ-dimethylamino-β-hydroxybutyronitrile chloromethylate was hydrolyzed for about 10 hours in a concentrated hydroalcoholic solution of HCl, there were formed "not inconsiderable quantities of a substance probably constituted by a bimolecular combination (ether or ester)." In Engeland's process, the monomolecular derivative was separated from what the author considered to be the bimolecular substance, by taking advantage of the fact that the chloroaurate of the "bimolecular" derivative was less soluble than the chloroaurate of γ-trimethylamino-β-hydroxybutyric acid, since it had a higher gold content. It is clear from the very nature of the reagents employed, that this process of separting carnitine in the form of its chloroaurate is totally unsuitable for use on the industrial scale.

In 1953, H. E. Carter and P. K. Bhattacharyya (J. Am. Chem. Soc., (1953), 75, 2503) described another process for preparing carnitine. This process is, however, quite separate and distinct from that covered by the present invention, since it involves the use of γ-amino-β-hydroxybutyric acid and not γ-dimethylamino-β-hydroxybutyronitrile chloromethylate as the intermediate substance in the preparation of carnitine.

Yet another process has been described by E. Strack, H. Roehnert and I. Lorenz (Ber. (1953), 86, 525). This latter process involves, as in the present invention, the use of γ-dimethylamino-β-hydroxybutyronitrile chloromethylate as starting substance, which is hydrolyzed, not directly, but by means of the ethyl imino-ether formed in an anhydrous alcoholic medium. In the operations relating to the separation of carnitine, after hydrolysis, this process, unlike the present invention, necessitates the employment of Reinecke salt and silver sulfate which inevitably imposes severe limitations on the possibility of using this process on any appreciable scale.

This invention relates to the process of hydrolyzing γ-dimethylamino-β-hydroxybutyronitrile chloromethylate in a vehicle of such a character as to permit isolation of the hydrolysis product easily and cheaply. It relates specifically to hydrolysis in strong aqeuous hydrochloric acid to which heat is applied. Usage of strong hydrochloric acid as the vehicle provides for easy separation of the formed ammonium chloride as a solid phase and isolation of the hydrolysis product by evaporating the filtrate and treating the thus obtained product with suitable water miscible organic alcohols or ketones or mixtures of such organic liquids. The process constituting the present invention comprises the operations of hydrolysis of the starting product and of separation and purification of the final substance in such circumstances that each operation is complementary to the other so that the process forms in itself an interdependent whole.

γ-dimethylamino-β-hydroxybutyronitrile chloromethylate hydrolyzes easily in strong aqueous hydrochloric acid and especially high temperatures are not required. A temperature in the range of 50 to 140° C. suffices and permits practical operation. The temperature employed is in part a function of the product to be produced. The first product of the hydrolysis is the N-methochloride of γ-dimethylamino-β-hydroxybutyric acid, carnitine. This product, in common with β-hydroxy aliphatic acids generally, tends to lose water, forming the corresponding α,β-unsaturated acid or in this case the N-methochloride of γ-dimethylamino-α,β-butenic acid. However, carnitine is believed to lose water also in another way: by a self esterification in which two molecules are involved with the hydroxyl of one molecule esterifying the carboxyl of the other. When temperatures in the upper portion of the 50–140° C. range are used these post-hydrolysis reactions occur so that the product obtained from the practice of this invention is a mixture of carnitine, the corresponding olefinic acid and perhaps the self esterified carnitine which has been referred to as carnitine carnitinate. Thus, usage of an hydrolysis temperature of 120° C. results in a product consisting of about 40% carnitine and 60% of the other materials, and when the purpose is to produce the olefinic product, the process would be operated at this temperature or possibly at an even higher one for a suitable period of time. However, when the purpose is to produce carnitine, a temperature in the lower range, for example, a temperature of 75° C. is used for the period just long enough to effect the hydrolysis; carnitine having a minimum purity of 95% is had even under industrial production conditions, which represents a valuable advance in the technique of production of this useful substance.

When temperatures in the upper ranges are used, the reaction mixture is heated in a closed vessel under conditions such that the pressure is that characteristic of the mixture at the temperature being employed.

The following examples will serve to indicate how the hydrolysis is carried out, how the ammonium chloride is separated out, and how the product is isolated and brought into usable condition by means of the hydrophilic liquids.

When operating at temperatures of 100 to 140° C. γ-dimethylamino-β-hydroxybutyronitrile chloromethylate, dissolved in concentrated hydrochloric acid, is heated under pressure for several hours.

After cooling, the solution obtained is separated from the by-product ammonium chloride, insoluble in concentrated hydrochloric acid, and concentrated under vacuum until incipient crystallization, after which the crystalline magma is disintegrated by means of 10 volumes of acetone and 1 volume of methanol.

By filtration or centrifuging, a first fraction is thus obtained.

From the solution, a second fraction of product is recovered by evaporating under vacuum, dissolving the residue in concentrated hydrochloric acid, purifying with an adsorption agent, evaporating and crystallizing under vacuum, mixing the crystalline magma with a mixture of acetone and methanol, and separating by filtration or centrifuging as for the first fraction.

The conditions of operation for this method of preparation employing the higher range of temperatures for the hydrolysis reaction are illustrated by the following non-limiting example:

EXAMPLE I

In a 100-litre capacity autoclave, 15 kg. of γ-dimethylamino-β-hydroxybutyronitrile chloromethylate are dissolved in 25 litres of concentrated hydrochloric acid, the solution heated at 100°–110° C. for about 6 hours, then at 120°–130° C. for 3 hours, allowed to cool and the ammonium chloride needles so formed, insoluble in concentrated hydrochloric acid, are filtered.

By heating under vacuum, the hydrochloric solution is concentrated until crystals appear, and maintained hot under vacuum for several hours until the product is as dry as possible. The residual crystalline magma is then disintegrated with a mixture of 40 litres of acetone and 4 litres of methanol and filtered.

In this way, a first fraction containing 5 kg. of the product is obtained. The acetone solution is then evaporated under vacuum and the residue dissolved in 5 litres of concentrated hydrochloric acid. 100 g. of animal charcoal are added to this solution which is then concentrated under vacuum until incipient crystallization, dissolved in 3 litres of water, the animal charcoal separated, the solution again concentrated under vacuum, and dissolved in 3 litres of concentrated hydrochloric acid. The solution is evaporated under vacuum until crystals appear, maintained hot under vacuum for several hours, the residual crystalline magma disintegrated with a mixture of 20 litres of acetone and 2 litres of methanol and filtered. In this way, a second fraction of 5 kg. of the product is obtained, i.e., a total of 10 kg.

The product may be dried in the oven at 70° C.

It is an ivory powder, slightly hygroscopic, with a melting point (instantaneous) between 198° and 200° C. The existence of a free carboxyl group in the molecule is evidence by the fact that the substance will free other relatively strong organic acids, such as benzoic acid, from their salts. In biological trials, the product behaves exactly like natural carnitine.

By the novel process herein described, a product exhibiting the biological activity of carnitine can be produced from γ-chloro-β-hydroxy-butyronitrile and trimethylamine. This synthesis can be effected in a series of operations in which these two compounds are reacted under pressure in alcoholic solution to form γ-dimethylamino-β-hydroxybutyronitrile chloromethylate. This latter product is hydrolyzed and treated with concentrated hydrochloric acid at temperatures between about 50° and about 120° C. for several hours. Approximately two times as much concentrated hydrochloric acid by weight as γ-dimethylamino-β-hydroxybutyronitrile chloromethylate has repeatedly given satisfactory results.

Since carnitine is most efficiently obtained in crystalline form from an anhydrous medium, it is expedient to remove substantially all water from the solution by evaporation under vacuum. It follows that the use of anhydrous equipment will simplify the recovery procedure.

The vacuum dried solution is treated with a mixture of hydrophilic liquids, one of which is a solvent for the product while the other is a precipitant therefor. By suitable selection of proportions, the product will be deposited as crystals while any moisture present will be retained by the hydrophilic liquids so as not to interfere with the crystallization and recovery.

The lower alkanols which are water miscible, e.g., methanol, ethanol, the propanols, and tertiary butyl alcohol, are suitable solvents for the product while hydrophilic nonsolvents such as acetone, are suitable precipitants therefor. Particularly satisfactory results are obtained by employing a mixture of methanol and acetone wherein the methanol comprises less than one part by volume for each five parts of acetone by volume. A preferred volume proportion of methanol to acetone is 1:10, as shown in the example. The use of these various hydrophilic agents is particularly indicated in view of their respective solubilizing powers. On the basis of the foregoing considerations, just as methanol can be replaced by its immediate homologs as solubilizing agents, so can acetone be replaced by dioxanes a precipitating agent.

The process as operated at the lower temperature and with the several ways of working up the reaction mixture may be set out schematically as follows:

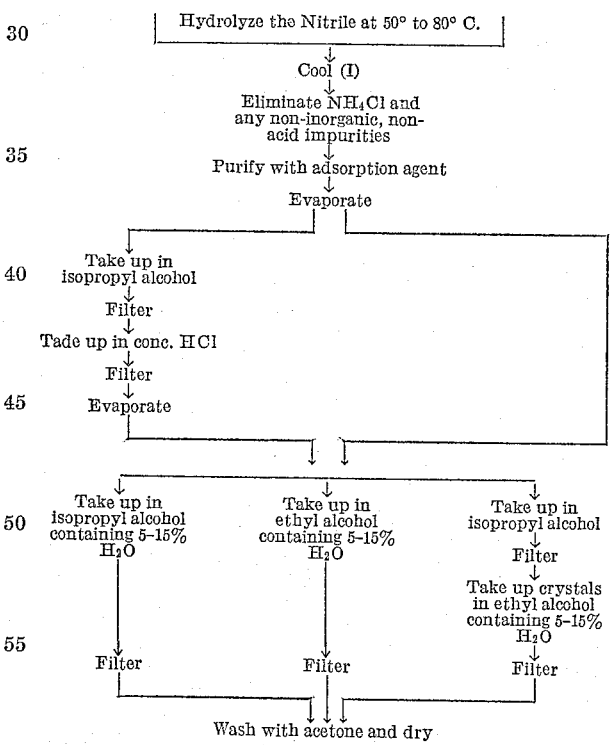

(I) The concentrated aqueous HCl hydrolysis medium may be saturated with HCl gas after cooling.

The following is a detailed description and commentary of the preferred process when the purpose is to produce carnitine.

(A) γ-dimethylamino-β-hydroxybutyronitrile chloromethylate is hydrolyzed in one to two times the same quantity of concentrated aqueous HCl, which may be saturated with HCl gas, at a temperature of between 50° and 80° C.

The duration of the operation is from 3 to 7 hours, it being preferable to prolong the reaction within these limits when working at the lower range of temperature. The reaction may be performed at atmospheric pressure in which case the apparatus should be fitted with a condenser to reduce the loss of HCl to the minimum. When working on the industrial scale, however, it will be found more advantageous although not essential, to operate at autogenous pressure in a closed circuit. The concentrated aqueous HCl employed should, for good results, contain a minimum of 30% and preferably 38% HCl by weight ($D=1.19$).

The fact of reacting $\gamma$-dimethylamino-$\beta$-hydroxybutyronitrile chloromethylate in a concentrated aqueous HCl medium, saturated, if preferred, with HCl gas, not only ensures a suitable medium for effecting the hydrolysis of the nitrile but also provides extremely advantageous conditions for performing the subsequent operations of separation and purification. By reason of the different solubility rates of the various products present after hydrolysis, the concentrated or saturated aqueous HCl medium enables the $NH_4Cl$ together with any non-inorganic, non-acid products formed to be easily eliminated. It also enables the main hydrolysis product when separated to be purified by suitable solvents.

It should be emphasized at this juncture that when the purpose is to prepare carnitine great care must be exercised during the operation of hydrolysis to avoid as far as is possible the formation of olefinic derivatives side-by-side with the carnitine. Accordingly, in this phase of the invention, it is recommended that the temperature of the hydrolysis reaction be limited to a range of 50° to 80° C., because it has been found that at the lower end of this range the temperature is sufficient to ensure adequate hydrolysis of the nitrile within a reasonable period of time while at the upper end the formation of undesirable by-products, side-by-side with the carnitine, is minimal. Operations conducted at temperatures exceeding this range but still within the overall range of 50°–140° C. necessarily lead to the formation of olefinic derivatives in the final substance with a proportionate decrease in the carnitine content of the latter.

The actual conditions of hydrolysis are therefore governed by an interdependent complex of factors, notably, temperature, duration of reaction, concentration of the aqueous HCl used and the ratio between the quantity of HCl and of nitrile employed. These factors may vary in relation to one another within certain limits according to the production facilities available and the individual preference of the operator. For example, the duration of the reaction may be made to vary in inverse proportion to the temperature employed within the limits indicated. The particular conditions of hydrolysis described in the following examples have been found, under the circumstances in which the operations were performed, to facilitate to the maximum the subsequent operations of separation and purification by the specific means indicated.

(B) After hydrolysis is completed, the reaction mixture is cooled to about 5° C. and maintained at this temperature for as long as is necessary to enable the maximum quantity of $NH_4Cl$ and non-inorganic non-acid by-products formed during hydrolysis to crystallize out.

Since the conditions and mechanism of the hydrolysis reaction serve to diminish the HCl concentration of the initial solution and since the $NH_4Cl$ and the non-acid by-products nevertheless retain a certain degree of solubility in the reaction medium, this solubility may be reduced, and at the same time the loss of HCl made up, by saturating the cold reaction mixture with HCl gas before fractional crystallization. This operation of saturation is not, however, essential to the successful performance of the process, but is merely cited as a suitable adjunct to facilitate the operation.

(C) After the reaction mixture is purified by means of an adsorption agent, the carnitine chloride contained therein is separated out, first by evaporation under vacuum at 50° C.–60° C. of the reaction mixture and then by treatment of the remaining crystals with various solvents.

Careful attention must be paid during evaporation to avoid the formation of olefinic derivatives. It is for this reason that it is recommended to work under vacuum and within the temperature limits indicated.

The selection of the solvents used in accordance with the claimed process is made not only with a view to facilitating the operations of filtering and drying, but above all with a view to ensuring a high degree of purity in the final product.

The first condition which the solvents selected must fulfill is that they must be hydrophilic. From this point of view the lower alkanols ($C_1$ to $C_4$) and lower aliphatic ketones, such as acetone, may be employed. However, besides dissolving the water still present in the carnitine crystals, these solvents must also be capable of dissolving as much as possible of the impurities, such as $NH_4Cl$, olefinic derivatives and non-inorganic, non-acid by-products, accompanying the main product. Furthermore, they must not, by their own reactivity, provoke the formation of other substances which could affect the pharmacological action of the carnitine. It has been found that these conditions are admirably fulfilled by the use of either isopropyl alcohol or ethyl alcohol or both these alcohols used successively in the order cited.

It has been further found that dissolution of the by-products accompanying the carnitine is achieved mor effectively if the alcohol used for the actual purification contains a certain amount of water, varying between 5 and 15% according to the degree of purity already attained in the mixture to be treated.

An additional operation which is advantageous to the result, although not essential, is to take up the crude carnitine, obtained after purification of the hydrolysis product with activated charcoal and evaporation, in isopropyl alcohol, filter the mixture and effect partial dissolution of the resultant product in concentrated HCl. The concentrated HCl thus plays the part of a solvent and helps to ensure the elimination of a greater proportion of the $NH_4Cl$ and non-acid by-products present in the reaction mixture. The product thus treated with HCl is then filtered, the filtrate is evaporated and the resultant product is treated with the alcoholic solvents referred to above.

Different variations of the operations of separation and purification, based on the general principles set forth above, may be described as follows:

(I) The crystalline magma remaining after evaporation of the hydrochloric acid is taken up in isopropyl alcohol and then filtered. The resultant crystals are impregnated with ethyl alcohol containing from 5 to 15% of water. The mixture is allowed to stand for several hours and is then thoroughly filtered. The crystals remaining are washed with acetone and dried.

(II) The crystalline magma remaining after evaporation of the hydrochloric acid is simply taken up in ethyl alcohol containing from 5 to 15% of water. The mixture is allowed to stand for several hours and is then thoroughly filtered. The crystals remaining are washed with acetone and dried.

(III) The crystalline magma remaining after evaporation of the hydrochloric acid is simply taken up in isopropyl alcohol containing from 5 to 15% of water. The mixture is allowed to stand for several hours and is then thoroughly filtered. The crystals remaining are washed with acetone and dried.

(IV) The crystalline magma remaining after evaporation of the hydrochloric acid is taken up in isopropyl alcohol, filtered, and the crystals taken up in concentrated HCl. The resultant mixture is again filtered and the hydrochloric solution evaporated under vacuum at a temperature not exceeding 60° C. The crystals remaining after evaporation are then processed in accordance with one of the processes described under (I), (II) or (III) above.

It is not intended that the invention should be limited to any one or combination of the above variations, nor is it intended that the invention should be limited to any of the following examples which are set out solely for illustration purposes as means of operating when the purpose is to produce carnitine.

EXAMPLE II 2 kg. of γ-dimethylamino-β-hydroxybutyronitrile chloromethylate are dissolved in 2 l. of concentrated aqueous hydrochloric acid (38% of HCl by weight). The solution is heated, while stirring, at 75° C. for three hours at atmospheric pressure in an apparatus fitted with a vertical condenser and stirrer. At the end of this period the hydrochloric solution is cooled and, while still being cooled, is saturated with HCl gas. The solution saturated with HCl is kept at a temperature of about 5° C. for about 10 hours by means of a cooling mixture. The $NH_4Cl$ and the non-acid impurities which crystallize under these conditions are removed by filtration when cold. The filtrate is purified, when cold, by means of activated charcoal, after being diluted with a litre of water.

The activated charcoal is filtered out and the hydrochloric solution of carnitine is evaporated under vacuum at a temperature not exceeding 60° C. in the evaporation apparatus.

When a degree of evaporation is obtained sufficient to produce crystallization, the operation of evaporation is continued as long as it is reasonably possible to stir the crystals obtained. The crystalline magma is then cooled and taken up in 1600 ml. of isopropyl alcohol in which care is taken to disintegrate the agglomerated masses of crystals. The mixture is filtered and the isopropyl alcohol with which the crystals are impregnated expressed with as much force as possible.

The crystals obtained are treated when cold for 4 hours with ordinary ethyl alcohol (94%) in the proportion of 0.7 cc. of ethyl alcohol per gram of carnitine. Care must be taken to ensure that all the crystals are impregnated with alcohol and that all agglomerated masses are completely disintegrated. The mixture is allowed to stand for 4 hours, after which it is filtered until the alcoholic solution is expressed to the maximum. The remaining crystals are washed over a filter with acetone and dried. Yield: 1600 g.

*Analyses*

MOLECULAR ANALYSIS

| | Percent |
|---|---|
| Carnitine | 96.4 |
| Olefins (expressed in terms of crotonic betaine) | 1.4 |
| $NH_4Cl$ | 1.1 |
| Moisture | 0.15 |

CENTESIMAL ANALYSIS

| | C | H | N | Cl | O |
|---|---|---|---|---|---|
| Theoretical figures for carnitine chloride | 42.53 | 8.16 | 7.08 | 17.97 | 24.30 |
| Figures found | 42.59 | 8.28 | 6.92 | 18.22 | 24.10 |

If the quantity of concentrated aqueous HCl used is doubled in relation to the amount of γ-dimethylamino-β-hydroxybutyronitrile chloromethylate, the conditions of filtration, after crystallization of the $NH_4Cl$ and non-acid impurities, are so improved that the yield by weight in crude carnitine rises to 92%. This variation of the process, however, involves the use of more voluminous apparatus.

EXAMPLE III 2 kg. of γ-dimethylamino-β-hydroxybutyronitrile chloromethylate are hydrolyzed in concentrated aqueous hydrochloric acid in accordance with the process described in Example II hereabove. After the operation of purification with activated charcoal the reaction product is evaporated at a temperature not exceeding 60° C. until the resultant crystals are as dry as possible. The crystalline magma is taken up in aqueous ethyl alcohol using 100 ml. of the latter to 100 g. of crude carnitine, care being taken to ensure complete disintegration of any agglomerated masses of crystals. The mixture is allowed to stand, at room temperature, for 10 hours, after which it is filtered, the ethyl alcohol being expressed with as much force as possible. The remaining crystals are washed with acetone and dried.

The table given hereunder shows the percentage of pure carnitine contained in the final product together with the yield by weight, according to the quantity of water in the alcohol.

| | Carnitine content, percent | Yield by weight, percent |
|---|---|---|
| After evaporation of the HCl solution | 89 | |
| 94% ethyl alcohol + 6% $H_2O$ | 94.3 | 91 |
| 90% ethyl alcohol + 10% $H_2O$ | 95 | 85 |
| 85% ethyl alcohol + 15% $H_2O$ | 96.4 | 78 |

In the place of aqueous ethyl alcohol, aqueous isopropyl alcohol may be used. The process is identical with that described above and the following table shows the percentage of pure carnitine contained in the final product and the yield by weight, according to the amount of water contained in the isopropyl alcohol used:

| | Carnitine content, percent | Yield by weight, percent |
|---|---|---|
| After evaporation of the HCl solution | 89 | |
| 100% isopropyl alcohol | 93.3 | 94 |
| 95% isopropyl alcohol + 5% $H_2O$ | 94.5 | 89 |
| 90% isopropyl alcohol + 10% $H_2O$ | 95.2 | 82 |

EXAMPLE IV 2 kg. of γ-dimethylamino-β-hydroxybutyronitrile chloromethylate are dissolved in 2 l. of concentrated hydrochloric acid. The hydrolysis reaction is conducted as described in Example II except that the concentrated aqueous HCl medium is not saturated with HCl gas. After evaporation of the reaction mixture under vacuum at a temperature not exceeding 60° C. the remaining crystals are taken up in about 1600 ml. of isopropyl alcohol and the mixture filtered.

The resultant crystals are then dissolved, when cold, in concentrated HCl (38%) in the proportion of 60 ml. of concentrated HCl to 75 g. of crude carnitine. Care must be taken to disintegrate any agglomerated mass of crystals. The solution is stirred slowly for 2 hours, after which it is allowed to stand overnight at 5° C. The non-acid impurities and $NH_4Cl$ which crystallize under these conditions are then filtered out when cold. The remaining solution is evaporated under vacuum at a temperature not exceeding 60° C. and the resultant crystals treated with alcohol, washed with acetone and dried as already described. Yield: 1300 g.

*Analyses*

MOLECULAR ANALYSIS

| | Percent |
|---|---|
| Carnitine | 99.0 |
| Olefins (expressed in terms of crotonic betaine) | 0.8 |
| $NH_4Cl$ | 0.1 |
| Moisture | 0.05 |

CENTESIMAL ANALYSIS

| | C | H | N | Cl | O |
|---|---|---|---|---|---|
| Theoretical figures for carnitine chloride | 42.53 | 8.16 | 7.08 | 17.97 | 24.30 |
| Figures found | 42.76 | 8.12 | 7.19 | 17.65 | 24.47 |

Various changes and modifications may be made without departing from the spirit and scope of the present What we desire to claim and protect by Letters Patent is:

1. The process for preparing carnitine which comprises reacting γ-dimethylamino-β-hydroxybutyronitrile chloromethylate, under autogenenous pressure, with one to two times its weight of concentrated aqueous hydrochloric acid containing between 30% and 38% hydrochloric acid by weight, at a temperature between about 50° and about 80° C., for 3 to 7 hours, filtering out the ammonium chloride and non-acid, non-inorganic impurities formed, evaporating the hydrochloric solution in vacuo at a temperature not exceeding 60° C., taking up the residue in isopropyl alcohol, filtering and taking up the resultant crystals in aqueous ethyl alcohol, filtering, washing the residue with acetone and drying.

2. The process according to claim 1 which comprises reacting γ-dimethylamino-β-hydroxybutyronitrile chloromethylate with the concentrated aqueous hydrochloric acid at a temperature between 70° C. and 80° C.

3. The process according to claim 1 which comprises taking up the hydrolysis product obtained, after evaporation of the hydrochloric solution, in isopropyl alcohol, filtering and taking up the residue in concentrated hydrochloric acid, filtering, evaporating the solution so obtained and taking up the residue in isopropyl alcohol, filtering, taking up the resultant crystals in aqueous ethyl alcohol, filtering, washing the residue with acetone and drying.

4. The process for preparing carnitine which comprises reacting γ-dimethylamino-β-hydroxybutyronitrile chloromethylate, under autogenous pressure, with one to two times its weight of concentrated aqueous hydrochloric acid containing between 30% and 38% hydrochloric acid by weight, at a temperature between about 50° C. and about 80° C., for 3 to 7 hours, filtering out the ammonium chloride and non-acid, non-inorganic impurities formed, evaporating the hydrochloric solution, in vacuo at a temperature not exceeding 60° C., taking up the residue in aqueous ethyl alcohol, filtering, washing the residue with acetone and drying.

5. The process according to claim 4 which comprises reacting γ-dimethylamino-β-hydroxybutyronitrile chloromethylate with the concentrated aqueous hydrochloric acid at a temperature between 70° C. and 80° C.

6. The process according to claim 4 which comprises taking up the hydrolysis product, obtained after evaporation of the hydrochloric solution, in isopropyl alcohol, filtering and taking up the residue in concentrated hydrochloric acid, filtering, evaporating the solution so obtained and taking up the residue in aqueous ethyl alcohol, filtering, washing the residue with acetone and drying.

7. The process for preparing carnitine which comprises reacting γ-dimethylamino-β-hydroxybutyronitrile chloromethylate, under autogenous pressure, with one to two times its weight of concentrated aqueous hydrochloric acid containing between 30% and 38% hydrochloric acid by weight, at a temperature between about 50° C. and about 80° C., for 3 to 7 hours, filtering out the ammonium chloride and non-acid, non-inorganic impurities formed, evaporating the hydrochloric solution in vacuo at a temperature not exceeding 60° C., taking up the residue in aqueous isopropyl alcohol, filtering, washing the residue with acetone and drying.

8. The process according to claim 7 which comprises reacting the γ-dimethylamino-β-hydroxybutyronitrile chloromethylate with the concentrated aqueous hydrochloric acid at a temperature between 70° C. and 80° C.

9. The process according to claim 7 which comprises taking up the hydrolysis product, obtained after evaporation of the hydrochloric solution, in isopropyl alcohol, filtering and taking up the residue in concentrated hydrochloric acid, filtering, evaporating the solution so obtained and taking up the residue in aqueous isopropyl alcohol, filtering, washing the residue with acetone and drying.

10. The process for preparing carnitine which comprises reacting γ-dimethylamino-β-hydroxybutyronitrile chloromethylate, under autogenous pressure, with one to two times its weight of concentrated aqueous hydrochloric acid containing between 30% and 38% hydrochloric acid by weight, at a temperature between about 50° and about 80° C. for 3 to 7 hours, cooling and separating the insoluble ammonium chloride and non-acid, non-inorganic impurities formed.

11. The process for preparing carnitine which comprises reacting γ-dimethylamino-β-hydroxybutyronitrile chloromethylate, under autogenous pressure, with one to two times its weight of concentrated aqueous hydrochloric acid containing between 30% and 38% hydrochloric acid by weight, at a temperature between about 70° C. and about 80° C., for 3 to 7 hours, cooling and separating the insoluble ammonium chloride and non-acid, non-inorganic impurities formed.

References Cited in the file of this patent

UNITED STATES PATENTS 1,450,675   Stine _____ Apr. 3, 1923

FOREIGN PATENTS 519,826   Belgium _____ Nov. 9, 1953

OTHER REFERENCES

Engeland: Deut. Chem. Ber., vol. 43, pp. 2705–6 (1910).

Carter et al.: Arch. Biochemistry and Biophys., vol. 38, p. 405–16 (July 1952).